United States Patent Office 3,408,558
Patented Oct. 29, 1968

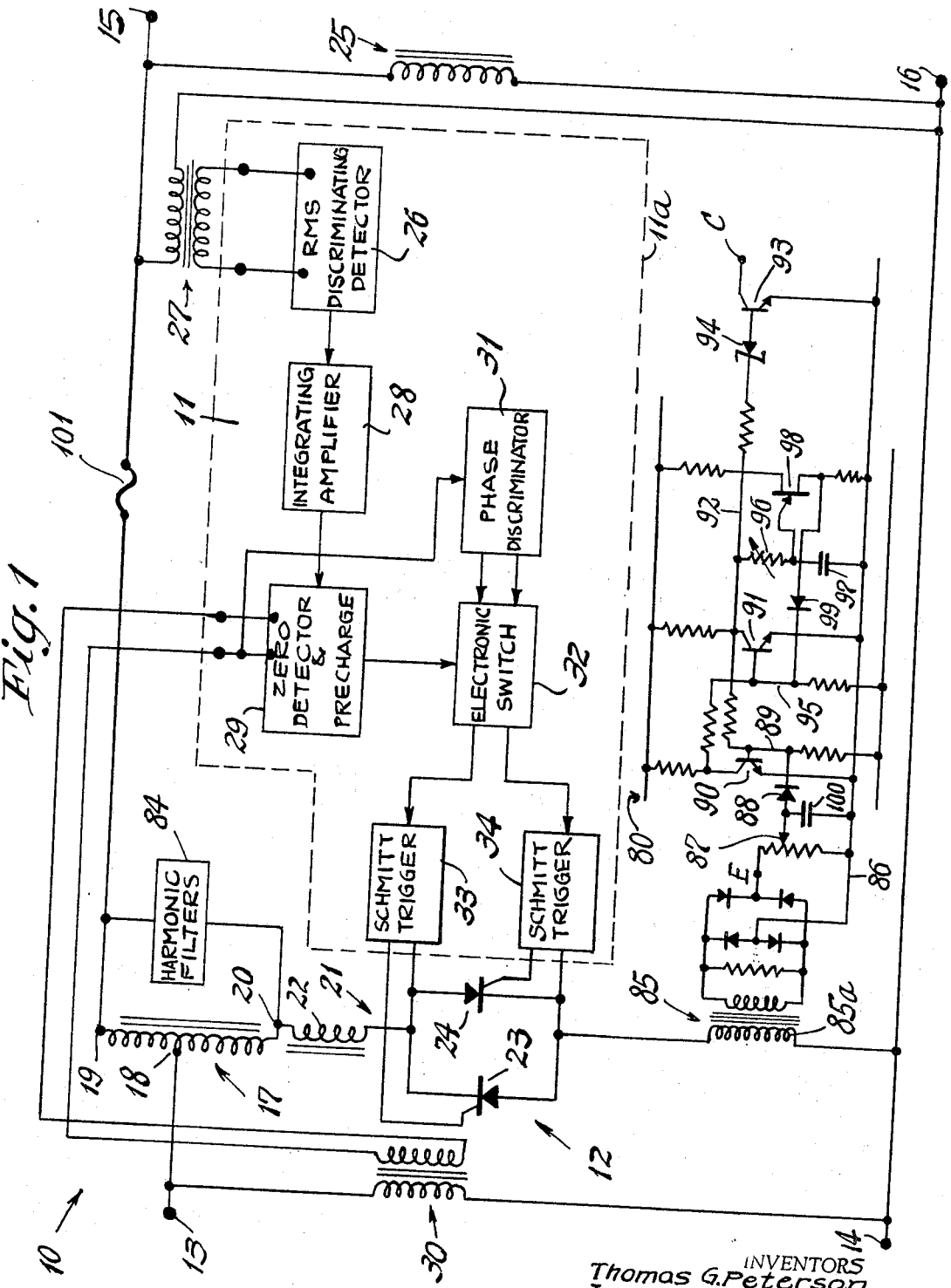

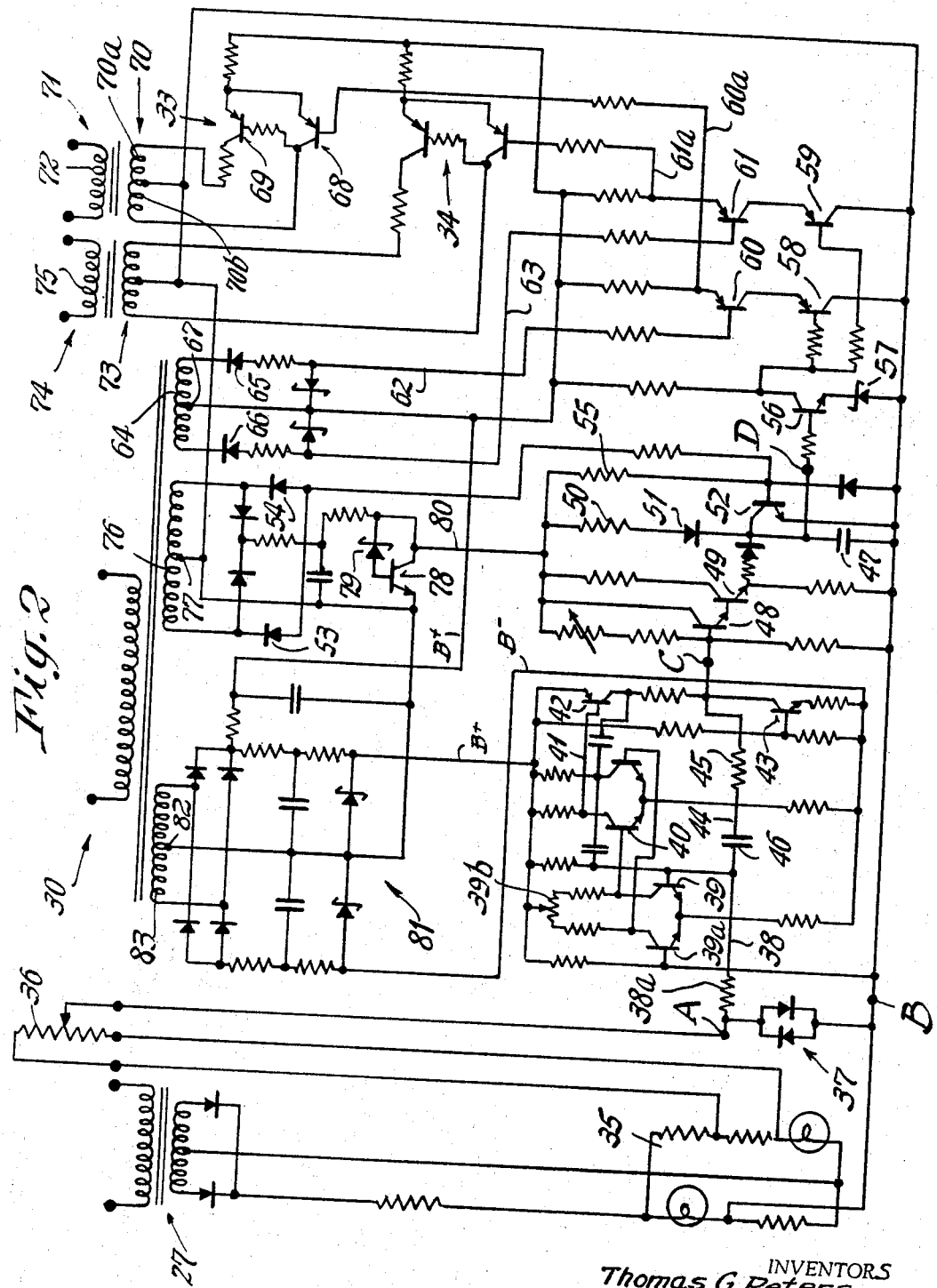

3,408,558
AUTOMATIC VOLTAGE REGULATOR WITH SEMICONDUCTOR SHUNT PATH
Thomas G. Peterson, Bristol, and James P. Somerset, Wethersfield, Conn., assignors to The Superior Electric Company, Bristol, Conn., a corporation of Connecticut
Filed Dec. 15, 1965, Ser. No. 513,963
6 Claims. (Cl. 323—22)

ABSTRACT OF THE DISCLOSURE

An automatic voltage regulator having a shunt path which when conductive provides a voltage that is vectorially added to the output voltage to provide the regulation of the input voltage to the desired value of the output voltage in which the shunt path includes controlled rectifiers that are rendered conductive by a control circuit that includes an integrating amplifier and in which overcurrent protection is provided in the shunt path.

While it has heretofore been proposed to provide voltage regulators that maintain an output voltage substantially constant with changes in value of the input voltage and/or load controlled, such heretofore suggested regulators have not been found to be completely satisfactory. Each regulator basically includes a regulating unit and a control unit and for each different range of power that a regulator is designed to control, a different size of regulating unit is required. This, in heretofore suggested regulators, has also required a different control unit and thus standardization or use of the same control unit for different sizes of regulating units has not been possible. Also, the larger size regulators have not been found completely satisfactory in view of their slower speed of response in correcting deviations of the output voltage from the desired value.

It is accordingly an object of the present invention to provide a voltage regulator having a control unit which is usable with different sizes of power handling regulating units.

Another object of the present invention is to provide a regulator which has a relatively rapid speed of response even in the larger sizes.

A further object of the present invention is to provide a voltage regulator in which, even though solid state switch type components are used in the regulating unit, the regulator has a relatively low percentage of distortion in the output voltage.

Still another object of the present invention is to achieve the above objects with a voltage regulator which is relatively economical to manufacture, durable in use and more compact and lighter than heretofore suggested regulators.

Another object of the present invention is to provide an automatic voltage regulator in which the solid state components of the regulating unit are protected against overcurrents and yet in which the power regulated is not interrupted.

A feature of the present invention resides in a regulating unit that includes a transformer and a solid state switch that controls the effect of the transformer in regulating the A.C. input voltage to the desired value of output voltage. The switch is interconnected in the regulating unit to provide a shunt current path and by controlling the value of current flow in the shunt path, the effect of the transformer may be varied to achieve the regulation of the voltage. Specifically, the solid state switch in the shunt path consists of at least one semiconductor element that is rendered conducting by the application of the signal thereto at some time during each half cycle of the alternating current input. When the semiconductor is rendered conducting, it permits current to flow in the shunt path for at least the remainder of the half cycle which provides a voltage in the transformer that is vectorially added to the input voltage and combines therewith to provide the desired value of voltage at the output terminals.

The control unit which includes additional features, as will be hereinafter apparent, provides to the semiconductor element, a signal during each half cycle to render the semiconductor conducting. The time with respect to each half cycle of input voltage when the signal is provided is varied to adjust the relative value of the vectorially added voltage. Thus by changing the duration when the semiconductor is nonconducting and hence non-voltage producing and the duration when it is conducting and hence voltage producing, a value of voltage caused by the shunt path conduction may be obtained which when vectorially added to the input voltage produces for the total half cycle, the desired value of output voltage. The signal from the control unit is of sufficient strength to be capable of causing conduction for many different sizes of semiconductors, with each size having a different power handling capability and thus a substantially standard control unit may be used for regulators having different power handling capability ranges.

The regulator of the present invention further includes an overcurrent protection circuit for the semiconductor elements of the shunt path. More specifically, the protection circuit senses the current through the shunt path and if it nears in value the maximum allowable non-recurrent peak surge forward current, the semiconductor is prevented for at least its subsequent half cycle from being rendered conducting. As the maximum surge forward current is related to the value of the current and its duration, the protection circuit is caused to sense the relationship of both value and duration in order to only prevent conduction when the overcurrent in value and duration nears the maximum value permitted for the semiconductor. The power passing from the input terminals to the output terminals is not sensed by the semiconductor overcurrent protection circuit and thus will not be interrupted when the protection circuit operates.

Other features and advantages will hereinafter appear.

In the drawing:

FIGURE 1 is a block diagram of the automatic voltage regulator of the present invention.

FIG. 2 is an electrical schematic diagram of the control unit of the regulator shown in FIG. 1.

Referring to the drawing, the regulator is generally indicated by the reference numeral 10 and includes a control unit 11 having the elements in the blocks enclosed within the dotted line 11a and a regulating unit generally indicated by the reference numeral 12 that includes the other components. The regulating unit is employed to regulate A.C. voltage at input terminals 13 and 14 and provide at output terminals 15 and 16, an A.C. output voltage whose value is maintained substantially constant even with changes in the value of input voltage and/or the power consumed by the load.

The regulating unit 12 includes a transformer 17, specifically an autotransformer, having an intermediate tap 18 connected to the terminal 13 and one end 19 connected to the output terminal 15 while its other end 20 is connected to a shunt path circuit 21. The shunt path circuit includes a choke coil 22 serially connected to a pair of semiconductor elements 23 and 24. The semiconductor elements in the herein described embodiment of the invention are of the on-off type and may be controlled rectifiers. As the CR's 23 and 24 are controlling A.C., they are inversely and parallelly connected. If desired, however, a single semiconductor element for controlling A.C. may be employed.

It will be appreciated that between the input terminals 13 and 14 there is formed a shunt path by the portion of the winding of the autotransformer 17, between the tap 18 and the end 20 and the components 22, 23 and 24. When there is no current flowing in the shunt path by either CR conducting, the transformer 17 provides across the output terminals 15 and 16 a value of output voltage which is definitely related to the value of input voltage. When either of the CR's is conducting, a shunt path current will flow in the transformer 17 which will induce a voltage between tap 18 and end 19 that vectorially adds to the input voltage to produce the output voltage. The shunt path current induced voltage by reason of the components in the regulator is an A.C. voltage having a fundamental frequency tht is out of phase with the A.C. input and is normally lagging in phase. The relative value of the shunt path voltage with respect to the input voltage is varied by altering the time in each half cycle of the A.C. input when the CR is rendered conducting which alters the phase difference between the two voltages. By causing a CR to conduct longer, i.e. rendering it conductive earlier in the half cycle of the A.C. input voltage, the relative value of the shunt path voltage is increased and normally serves to increase the value of the output voltage while increasing the phase difference by a shorter conduction period, decreases the relative value of the shunt path voltage which normally serves to decrease the output voltage.

The conduction of a semiconductor, within the normal operating range of the transformer, occurs for each half cycle of the output voltage with the control unit sensing the value of the output voltage and applying to the semiconductor a signal at the proper time in the half cycle to effect conduction through the shunt path. For providing an output voltage whose value may be sensed, a continuous current flow between the output terminals is achieved by the use of an inductance 25 connected across the output terminals.

As shown in FIG. 1, the control unit includes an RMS discriminating detector 26 which is interconnected through a transformer 27 to receive a signal which is proportional to the RMS valve of the output voltage between the terminals 15 and 16. The detector 26 then produces a signal which is related to the difference between the actual output voltage and a set value thereof with the signal being fed to an integrating amplifier 28. The latter serves to change the signal into a relatively pure D.C. signal in which unwanted voltages, such as commonly termed noise, is eliminated. Moreover, the amplifier 28 also changes its signal value at a rate depending on the magnitude of the value of the detector 26 signal and in the opposite sense until the output voltage is at its desired value at which time the signal value is maintained constant.

The integrating amplifier signal is applied to a zero detector and precharge circuit 29. The circuit 29 is interconnected with a transformer 30 connected across the input terminals 13 and 14 to obtain an A.C. voltage having a known phase relationship with the input voltage. The voltage from the transformer 30 is also received by a phase discriminator 31 which is employed to cause a gate signal to be applied only to the CR which should be rendered conducting and thus acts to prevent a gate signal from being applied to both CR's simultaneously or to the wrong CR. Both the zero detector and precharge circuit 29 and phase discriminator 31 provide inputs to an electronic switch 32 which is connected to a pair of Schmitt trigger circuits 33 and 34. The trigger circuit 33 is connected to the CR 23 while the trigger circuit 34 is connected to the CR 24. The trigger circuits 33 and 34 are regenerative bistable circuits whose state depends on the amplitude of the input voltage and thus when the input voltage to either circuit passes a determined level the circuit shifts its state to provide a signal to its CR.

The zero detector and precharge circuit 29 produces a signal to the electronic switch at the time in each half cycle when a CR should be rendered conducting. The electronic switch 32 together with the phase discriminator 31 function as an "AND" gate to direct the signal to the proper trigger circuits 33 and 34 for the half cycle present in the A.C. input.

Referring to FIG. 2, the RMS discriminator circuit 26 may be any type of error detecting circuit and in the specific embodiment shown includes a lamp bridge 35 which produces across an adjustable resistor 36 a signal voltage between the points A and B which is related to the RMS value of the output voltage. Preferably, the values of the components of the bridge 35 are selected to effect a balancing of the bridge for the nominal value of input voltage and thus the signal voltage from the bridge will be a direct current of one polarity or the other depending on the direction of deviation and have a magnitude corresponding to the magnitude of the deviation of the output voltage from the value of output voltage which would effect balancing of the bridge. The adjustable potentiometer 36 connected in the bridge enables the value of output voltage which is desired to be maintained constant to be selected by changing the relative values of the components in the bridge.

The signal at the points A and B is accordingly a direct current signal which is substantially unfiltered and which contains extraneous A.C. voltages such as the harmonics of the A.C. input frequency, voltages introduced by the components of the bridge or through the transformer 27, etc., generally called "noise." A pair of inversely, parallelly connected diodes 37 are utilized to limit the magnitude of the signal from the bridge to a low value of voltage thereby obviating difficulties traceable to the possibility of an excessive output voltage when the regulator is initially energized by reason of the use of thermally-responsive non-linear elements, such as the lamps in the bridge 35. The point A is positive with respect to the point B when the actual output voltage is higher than its desired value and for the opposite condition, B is positive with respect to A.

The integrating amplifier 28 produces at the point C a direct current voltage which may be of one polarity or the other with respect to the common or ground of the circuit. Its value remains constant when the output voltage is at the desired value. When the output voltage has a higher value, the voltage at the point C decreases at a rate depending on the magnitude of the deviation with a greater deviation having an increased rate. At the instant that the output voltage has the desired value, the signal stops changing in value and remains constant. Thus the polarity of the signals at the points A and B sets the direction and magnitude of the change in value of the signal at the point C but does not necessarily cause a change in polarity thereof. The integrating amplifier 28 also functions to eliminate unwanted A.C. in the signal from the circuit 26 by being a high gain amplifier for D.C. signals and a variable gain amplifier for A.C. signals with the attenuation of the amplifier increasing as the A.C. frequency increases. Preferably the components are selected to be substantially unreactive to frequencies over 1–5 cycles per second, and thus the amplifier acts for each frequency substantially as a filter. Thus even if the signal at the points A and B consists of one half "noise" or A.C. signal of frequencies greater than 1–5 cycles per second, the "noise" will not affect the value of the voltage at the point C.

With the point A positive indicating that the output voltage is higher than desired, a lead 38 connected to the base of a transistor 39 is positive and renders transistor 39 more conducting through its collector-emitter path. The transistor 39 forms with a transistor 39a a differential amplifier with the latter being continuously conducting in its collector-emitter path with the amount of conduction being adjusted by an adjustable resistor 39b. The setting of the resistor 39b determines the value which the point C will have when no potential difference exists between the points A and B and is preferably set to about 7 volts positive. The variation in conduction between the transistors 39 and 39a effectively controls the conduction of a transistor 40 whose base is connected to the collector of transistor 39. A lead 41 is connected from the collector of transistor 40 to the base of a transistor 42 to regulate the conduction of transistor 42. The output point C is connected between the collector of the transistor 42 and the collector of a transistor 43 with the emitter of the former being connected to the B+ source and the emitter of the latter to the B— source. The transistors 42 and 43 vary their amounts of conduction oppositely and hence constitute adjustable resistances connected as a voltage divider.

In the operation of the integrating amplifier circuit 28, if the output voltage is higher than that desired then the value of the voltage at the point C will decrease while if the output voltage is lower than desired the voltage value at the point C will increase. In the first instance, the voltage on the lead 38 will be positive causing transistor 39 to conduct more, decreasing conduction of transistor 40 and decreasing conduction of transistor 42. The change in conduction of the transistor 42 causes the transistor 43 to conduct more which decreases the voltage at the point C as it goes toward the voltage of the B— source. Conversely with a negative voltage in the lead 38, transistor 39 will conduct less, transistor 40 conduct more, transistor 42 conduct more, transistor 43 will conduct less, and the voltage at the point C will increase positively.

The point C is serially connected to the lead 38 through a resistance 45 and a condenser 46 and to the point A through a resistance 38a. The lead 44 produces a feedback signal from the point C to the lead 38 which is negative to oppose the voltage in the lead 38. When there is a potential difference either positive or negative between the lead 38 and the point B, the value of the point C will change in a direction to eliminate the potential. Thus so long as the potential difference exists, the value of the point C will be changing. However, when the potential difference ceases, i.e. the lead 38 and the point B have the same potential, the value of the point C will remain at the level which enabled it to cease the potential.

The speed of response of the integrating amplifier is essentially relatively slow in having the value of the point C change with respect to a change in the potential at the point A. Thus for example for a voltage at the point A which includes A.C. signals on the order of 1–5 cycles per second or more there will be effectively no change in the value of the point C. The value of the point C will thus remain substantially unresponsive as the frequency diminishes until at about 1–5 cycles per second when it will become increasingly responsive to the value of the signal as the frequency of the A.C. signal decreases and the gain of the amplifier increases. The integrating amplifier accordingly tend to minimize or substantially eliminate A.C. voltages which may be superimposed on the direct current for frequency values of the A.C. which would be attributable to noise. The frequencies at which it is essentially unresponsive are preferably selected to be large enough to prevent undue decreasing of the speed of response of the regulator and is determined primarily by the values of the resistance 45 and condenser 46. Accordingly, the D.C. voltage at the point C is substantially free of any noise and represents the signal from the RMS sensing circuit 26.

The zero crossing and precharge circuit 29 changes the value of the voltage at the point C into a pulse width control of the CR's to control the time of firing of the CR's during each half cycle. The output of the circuit 29 appears at the point D as a voltage value at a time in each half cycle that depends upon the value of the voltage at the point C. The circuit 29 includes a condenser 47 which is initially precharged to a voltage value by conduction of transistors 48 and 49, the magnitude of conduction of both being controlled by the value of the voltage at the point C. The magnitude of conduction of transistor 49 provides a value of voltage at its emitter which is conducted to the condenser 47 and immediately precharges the condenser to substantially this value at approximately the beginning of each half cycle after the condenser 47 has been discharged. Also, the condenser 47 receives through a resistor 50 and a diode 51 a value of current which causes the voltage across the condenser to increase linearly. The charge on the condenser is accordingly the sum of the values of the precharge plus the duration and the linear charging rate. If the precharge of the condenser 47 is small, caused by a low value at the point C, then the linear charging produced through the components 50 and 51 will take longer for the value at the point D to achieve a selected value and thus the selected value of charge or voltage at the point D will occur later in the half cycle. On the other hand, with a higher voltage at the point C, the precharge voltage is greater and hence the linear charging components 50 and 51 will produce the desired value at the point D earlier in the half cycle.

A transistor 52 discharges the condenser 47 at the end of each half cycle. This is achieved by the use of diodes 53 and 54 which maintain the voltage at the base of the transistor 52 relatively negative for substantially all of each half cycle except at about zero crossing when a positive voltage, through a resistor 55 connected to the base of transistor 52, is greater than the negative voltage from the diodes and is sufficient to cause conduction of the transistor 52 effecting discharge of the condenser 47.

The point 5D is connected to the input of the phase discriminator 31 and electronic switch 32 which functions to assure that the proper CR which is capable of conducting is rendered conducting by producing a sharp pulse for effecting operation of the proper one of the trigger circuits 33 or 34. The electronic switch includes a transistor 56 that is rendered more conducting in its emitter-collector path as the value of the voltage at the point D increases due to the linear charging components 50 and 51. There is however connected in its emitter-collector path, a Zener diode 57 which has acute conducting characteristics and prevents current flow through the emitter-collector of transistor 56 until the voltage thereacross is sufficient to effect substantially instantaneous current conduction through the Zener diode 57. Prior to conduction through the Zener diode 57, transistors 58 and 59 are nonconducting with conduction being initiated by conduction through the Zener diode 57.

As both transistors 58 and 59 are operated simultaneously, the phase discriminating circuit includes transistors 60 and 61 connected in series with transistors 58 and 59 respectively to determine on which lead, 60a or 61a, a more negative voltage will appear to effect the operation of one or the other of the trigger circuits 33 and 34 respectively. Connected to the base of transistor 60 is a lead 62 while a lead 63 is connected to the base of transistor 61. The leads 62 and 63 are connected to opposite ends of a tapped secondary winding 64 through diodes 65 and 66 respectively. The emitters are connected to the center tap 67 of the winding. The winding 64 is part of the transformer 30 and hence has a known phase relationship to the A.C. input voltage. For the half cycle when the end of the winding connected to the diode 65 is positive, the base of transistor 60 is positive preventing its conduction while the base of transistor 61 is essentially negative, enabling it to conduct. During the other half cycle of input voltage, the diode 66 will be connected to the positive end of the winding 64 and the base of transistor 61 will be essentially positive preventing its conduction while the base of transistor 60 will be relatively negative enabling its conduction. Accordingly, even when both transistors 58 and 59 are conducting, a more negative voltage will appear in only one of the leads 60a and 61a, with the selection being determined by the half cycle of A.C. input voltage.

The leads 60a and 61a are connected to Schmitt trigger circuits 33 and 34 respectively. The circuit 33 includes a transistor 68 which is normally nonconducting but conducts when the transistors 58 and 60 conduct. Upon beginning of conduction of the transistors 58 and 60, the voltage at the base of transistor 68 becomes more negative, increasing its conduction and increasing the positive voltage at the base of transistor 68 becomes more negative, conduction through its collector-emitter path. Current stops flowing from the B+ source through the transistor 69 and a portion 70a of a primary winding 70 of a transformer 71 to produce a pulse or gate signal in its secondary winding 72 thereof. Simultaneously initiation of conduction through the transistor 68 produces in another portion 70b of the winding 70 a voltage pulse that is additive to the pulse produced in the other portion 70a. It has been found that the total pulse produced in the winding 70 by reason of it consisting of two separate pulses, is sufficient in power and voltage to constitute across the secondary winding 72 a signal that is capable of effecting conduction of a plurality of different semiconductors of different power handling capabilities.

The secondary winding 72 is connected between the gate and cathode of the CR 23 and thus the gate signal when applied causes the CR 23 to conduct. Similarly, the trigger circuit 34 is connected to a primary 73 of a transformer 74 having a secondary winding 75 that is connected between the gate and cathode of CR 24 and a gate signal will cause conduction of CR 24. It will be understood that the trigger circuit 33 after supplying a pulse continues to maintain conduction through the transistor 69 until the condenser 47 is discharged at the end of the half cycle. Moreover, the use of the trigger circuits 33 and 34 provides for negatively biasing during each half cycle the CR which should not conduct thereby preventing false firing which may be caused by transient conditions and/or high temperatures.

For supplying the circuit 29 with a substantially constant voltage, there is included a tapped secondary winding 76 of the transformer 30 having its midpoint 77 connected to the emitter of a transistor 78 with the outer ends of the windings being connected to the collector and base of the transistor 78. Interconnected between the collector and base is a Zener diode 79. The transistor 78 and Zener diode 79 are used to maintain a positive voltage of substantially constant value in the lead 80 that is connected to the linear circuit 29.

The B+ and B− direct current source for the control is obtained from a full-wave rectifier, generally indicated by the reference number 81, which supplies a relatively distortion free direct current to the various parts of the circuit from the midpoint 82 of a secondary winding 83 of the transformer 30.

During use, it has been found that harmonics of the A.C. frequency may appear in the output voltage which would produce distortion of the output voltage. To minimize the distortion, there is provided a harmonic filter circuit 84 (FIG. 1) connected between the end 20 and the end 19. The circuit 84 preferably includes inductors and capacitors designed specifically to filter the add harmonics such as 3rd, 5th, 7th and 9th–15th of the A.C. input frequency. The regulator herein described including the filter circuit 84 has been found capable of minimizing distortion to less than 2% under all operating conditions.

The regulator of the present invention has been found capable of functioning not only on nominal 60 cycle A.C. which includes the range of 40–70 cycles but also may be operated on 400 cycle A.C. With this latter frequency, the size of the condenser 47 should be less than that used for 60 cycle A.C. in order to decrease its charging capacity and hence time to achieve a selected level to cause conduction of transistor 56 though of course, if desired, the precharge and charging rates may be adjusted.

In accordance with the present invention, the semiconductors 23 and 24 are protected against overcurrents which could cause their destruction by an overcurrent protection circuit indicated by the reference numeral 80 (FIG. 1) that includes a current transformer 85 having a primary winding 85a connected in series in the shunt path 21. The current transformer secondary provides between the point E and a ground lead 86, a unidirectional voltage related to the value of the current in the shunt path. A selectable portion thereof as determined by the setting of a potentiometer 87 is directed through a diode 88 to a lead 89 that is connected to the base of a transistor 90. The transistor 90 and another transistor 91 are interconnected to form a bistable flip-flop circuit having an output lead 92 connected between the collector of the transistor 91 and the base of another transistor 93 through a Zener diode 94. The collector of transistor 93 is connected to the point C of the precharge circuit 29 (FIG. 2).

During normal operation of the regulator 10, the transistor 93 is nonconducting and presents between the point C and the ground lead 86 a sufficiently large impedance that it effectively constitutes an open circuit and hence does not effect the precharging of the condenser 47. In the event that current flows through the shunt path and has a value and a duration which is near the maximum allowable nonrecurrent peak surge forward current of the CR's 23 and 24, the transistor 93 is caused to become conducting and as such effectively short-circuits the point C and the ground 86. This prevents the precharge circuit from applying a precharge voltage to the condenser 47 and in so doing prevents the condenser from attaining a value of charge that is enough to cause the point D to have the potential necessary to cause operation of one of the Schmitt triggers. The transistor 93 becomes conducting upon the transistor 91 which is normally conducting being rendered nonconducting by the transistor 90 becoming conductive. The latter occurs when the voltage on the base lead 89 becomes of sufficiently positive value.

As the transistors 90 and 91 are interconnected in a bistable flip-flop circuit, when an overcurrent condition occurs, the transistor 90 will be maintained conducting to render transistor 93 conducting until a positive potential is applied to a lead 95 connected to the base of transistor 91 which causes the flip-flop circuit to change its state. The duration of preventing conduction of a CR is made adjustable by a reset circuit that includes an RC network having components 96 and 97 and a unijunction transistor 98. When the lead 92 becomes more positive by transistor 90 conducting, current flows through the resistor 96 to charge the condenser 97 and after a determinable duration, the condenser 97 will have a voltage thereacross which is sufficient to effect conduction of the unijunction transistor 98. A more positive potential will then appear on the lead 95 which through a diode 99 is impressed on the base of transistor 91 rendering it conducting and transistors 90 and 93 nonconducting. The circuit will again then sense the current flowing in the shunt path for the next half cycle and if it is still of too high a value, the transistor 93 will be again rendered conducting, preventing a CR from conducting during at least the subsequent half cycle. The number of half cycles in which the CR is prevented from conducting by the overcurrent protection circuit 84 is controlled by the RC network 96 and 97 and may be set to any desired value.

The CR's 23 and 24 have a maximum value of peak surge forward current which they can tolerate and it varies with the duration with which the current flows. Thus each CR will tolerate for a relatively long time current flow having a value slightly larger than rated current but will only tolerate large values of forward current for just a short period. The overcurrent protection circuit is caused to become operative whenever an overcurrent condition exists which nears the maximum value for both current and duration which the CR can tolerate. Thus the potentiometer 87 and a condenser 100 are interconnnected to form an RC network which controls the voltage on the lead 89.

It will be appreciated that for large values of overcurrent which a CR can tolerate for only a short period, the condenser 100 will be quickly charged to a value necessary to cause operation of the protection circuit 80, thereby immediately preventing further conduction of the CR's. For smaller values of overcurrent lesser current flows into the condenser 100 and it will take more than one cycle of conduction before the charge on the condenser is sufficient to effect operation of the protection circuit 80. Naturally as the amount of overcurrent decreases, the lesser will be the charging rate for each half cycle and hence the greater the number of half cycles which is required to charge the condenser to the necessary operating value. Thus the protection circuit permits the maximum relationship between current and duration which may pass through the CR's without preventing conduction of the CR's but yet when the value of current and duration closely approximates the maximum tolerable value of the CR's, they are prevented from conducting.

The setting of the potentiometer 87 determines the charging of the condenser 100 in relation to the value of current. During each half cycle when sufficient current is flowing in the shunt path to provide a voltage on the condenser greater than its charge voltage, the condenser charge is increased. When a lesser value of current, such as no current, is flowing, the condenser may discharge through the potentiometer. Thus the potentiometer may be adjusted to accommodate different CR's having different maximum tolerable values.

Though the transistor 93 is specifically described as being connected to the point C and change from a condition of high impedance to low impedance, it will be appreciated that if desired, it could be interconnected in the gate circuits of the CR's and change from low impedance to high impedance merely by making it responsive to the condition of transistor 90 as by connecting its base to the collector of transistor 90.

It will be appreciated that the overcurrent protection circuit 84 merely prevents conduction in the shunt path and even though current is prevented from flowing in the shunt path, power may flow between the input terminals 13 and 14 and 15 and 16 with interruption being determined by a fuse 101. This has been found particularly advantageous when the regulator is employed to operate electrical devices, such as motors or incandescent lamp loads which inherently possess a low initial resistance and subsequently increase their resistance. When for example a motor is started, a large overcurrent may flow between the input and output terminals of the regulators, effectively decreasing the output voltage with the decrease being sensed by the control circuit 11 and the CR's are caused to conduct early in each half cycle of the input voltage. Upon the CR's conducting, a large overcurrent may flow in the shunt path by reason of the decreased impedance between the tap 18 and end 20 of the transformer. If the overcurrent approximates the maximum CR tolerable overcurrent, the circuit 80 prevents conduction of the CR's for at least the subsequent half cycle. However, if the fuse 101 fails to be destroyed, current is continually flowing to the load and as such, in the case of a motor, its internal resistance will increase, decreasing the overcurrent thereto and subsequently the load will come within the normal range of the regulator.

It will accordingly be appreciated that there has been disclosed an automatic voltage regulator for providing a substantially constant output voltage from a variable source of A.C. The regulator includes a control unit which provides at the proper time a signal to semiconductor means to cause conduction in a shunt path of the regulating portion of the regulator. Without conduction, the shunt path normally provides a lower output voltage than when it is conducting. By sensing the output voltage and varying the initiation of conduction of the shunt path in each half cycle, a selected value of output voltage may accordingly be maintained.

Variations and modifications may be made within the scope of the claims and portions of the improvements may be used without others.

We claim:

1. An automatic voltage regulator comprising input terminals connectible to a source of A.C.; output terminals at which a desired value of output voltage appears; regulating means interconnected between the input terminals and the output terminals and including a shunt path having semiconductor means connected therein, said semiconductors means being normally nonconducting and being rendered conducting upon a firing signal applied thereto, means interconnecting said shunt path in said regulating means to provide a voltage when the semiconductor means is conducting that is vectorially added to the input voltage to provide the desired value of output voltage; and control means for providing the firing signal during each half cycle of the A.C. input voltage, said control means including sensing means for providing a signal indicative of the deviation of the output voltage from the desired value, firing signal producing means for receiving said deviation signal and providing a firing signal at a time during each half cycle that is related to the deviation signal, means for rendering said firing signal means responsive to said deviation signal for each half cycle and in which said deviation signal from the sensing means is substantially a D.C. signal having stray A.C. voltages imposed thereon, means for attenuating the A.C. voltages to provide an intermediate deviation signal that is substantially unrelated to the stray A.C. voltages and in the which the firing signal producing means is connected to receive said intermediate deviation signal.

2. The invention as defined in claim 1 in which the stray A.C. voltages have many frequencies and the attenuating means increases its attenuation with higher frequencies.

3. The invention as defined in claim 1 in which the means for attenuating the A.C. voltages includes an integrating amplifier means connected to receive the deviation signal and provide the intermediate deviation signal that changes its value at a rate determined by the magnitude of the deviation signal and in a direction determined by the polarity of the deviation signal and feedback means in the integrating amplifier means for attenuating the stray A.C.

4. An automatic voltage regulator comprising input terminals connectible to a source of A.C.; output terminals at which a desired value of output voltage appears; regulating means interconnected between the input terminals and the output terminals and including a shunt path having semiconductor means connected therein, said semiconductor means being normally nonconducting and being rendered conducting upon a firing signal applied thereto, means interconnecting said shunt path in said regulating means to provide a voltage when the semiconductor means is conducting that is vectorially added to the input voltage to provide the desired value of output voltage; and control means for providing the firing signal during each half cycle of the A.C. input voltage, said control means including sensing means for providing a signal indicative of the deviation of the output voltage from the desired value, firing signal producing means for receiving said deviation signal and providing a firing signal at a time during each half cycle that is related to the deviation signal, means for rendering said firing signal means responsive to said deviation signal for each half cycle and in which there are means for sensing the value of current flowing in the shunt path and means for preventing the application of a firing signal upon a determined value of current flowing in the shunt path.

5. The invention as defined in claim 4 in which the preventing means includes means for making the determined value of current responsive to both the value of the current and its duration to thereby approximate the maximum tolerable peak surge current of the semiconductor means.

6. In combination with an automatic voltage regulator comprising input terminals connectible to a source of A.C.; output terminals at which a desired value of output voltage appears; regulating means interconnected between the input terminals and the output terminals for regulating the input voltage to provide an output voltage having a substantially constant selected value and control means operatively associated with the regulating means for providing a signal to effect operation of the regulating means; the improvement in said control means including means for providing a deviation signal having a magnitude and polarity indicative of the deviation of the output voltage from a selected value, said deviation signal being substantially D.C. and having stray A.C. voltages imposed thereon and means for attenuating the A.C. voltages to provide an intermediate signal that is substantially unrelated to the stray A.C. voltages, said means including an integrating amplifier means connected to receive the deviation signal and provide an intermediate signal which changes its value at a rate determined substantially by the magnitude of the D.C. of the deviation signal and in a direction determined substantially by the polarity of the D.C. of the deviation signal.

References Cited

UNITED STATES PATENTS

| | | | |
|---|---|---|---|
| 3,222,592 | 12/1965 | Kellogg | 323—22 |
| 3,243,689 | 3/1966 | Perrins | 323—24 X |
| 3,263,157 | 7/1966 | Klein | 323—24 X |
| 3,281,652 | 10/1966 | Perrins | 323—19 |
| 3,295,053 | 12/1966 | Perrins | 323—24 X |

JOHN F. COUCH, *Primary Examiner.*

A. D. PELLINEN, *Assistant Examiner.*